United States Patent [19]
Aagano

[11] Patent Number: 4,717,241
[45] Date of Patent: Jan. 5, 1988

[54] LIGHT DEFLECTION DEVICE

[75] Inventor: Toshitaka Aagano, Kaisei, Japan

[73] Assignee: Fuji Photo Film Co., Ltd., Minami-ashigara, Japan

[21] Appl. No.: 743,376

[22] Filed: Jun. 11, 1985

[30] Foreign Application Priority Data

Jun. 11, 1984 [JP] Japan ................. 59-119657

[51] Int. Cl.⁴ .................. G02B 7/18; G02B 5/08; G02B 27/10; G02B 26/08
[52] U.S. Cl. .................. 350/174; 350/487; 350/287; 350/633
[58] Field of Search ............. 350/487, 486, 484, 174, 350/287, 633, 634, 6.6, 360

[56] References Cited

U.S. PATENT DOCUMENTS

| | | | |
|---|---|---|---|
| 1,980,888 | 11/1934 | Thomas | 350/487 |
| 3,856,409 | 12/1974 | Cindrich et al. | 350/484 |
| 3,909,135 | 9/1975 | Lipkind | 350/486 |
| 3,981,566 | 9/1976 | Frank et al. | 350/487 |
| 4,025,203 | 5/1977 | Lee | 350/487 |
| 4,090,781 | 5/1978 | Godof et al. | 350/486 |
| 4,149,779 | 4/1979 | Hamerdinger et al. | 350/633 |
| 4,176,401 | 10/1979 | Yoder et al. | 350/174 |
| 4,566,935 | 1/1986 | Hornbeck | 350/360 |

FOREIGN PATENT DOCUMENTS 750415 7/1980 U.S.S.R. ................. 350/6.6

OTHER PUBLICATIONS

J. A. Lowy et al., "Vibrating Mirror . . . ", *IBM Tech. Dis. Bull.*, vol. 19, No. 5, p. 1775.
L. J. Fiegel et al., "Blood Pressure Measuring Transducer", *IBM Tech. Dis. Bull.*, vol. 6, No. 7, Dec. 1963, pp. 57–58.
G. T. Sincerbox, "Laser Beam Combining", *IBM Tech. Dis. Bull.*, vol. 12, No. 10, Mar. 1970, pp. 1663–1664.

*Primary Examiner*—Jon W. Henry
*Attorney, Agent, or Firm*—Fleit, Jacobson, Cohn & Price

[57] ABSTRACT

A light deflection device is comprised of a cantilever member, a light deflecting element provided near the fixed end of the cantilever member, and a means of imparting deflection to the free end of the cantilever member, so that the angle of inclination of the light deflecting element, and hence the angle of deflection of the light, can be set and controlled with very high precision by the controlled deflection of the cantilever member by said means.

5 Claims, 4 Drawing Figures

LIGHT DEFLECTION DEVICE

BACKGROUND OF THE INVENTION

Field of the Invention

This invention relates to a device for deflecting light. More particularly, this invention relates to a device for deflecting a laser light beam or other stimulating light employed for example in a radiation image information recording and read-out system for reading out the image information, and by means of which the angle of deflection can be set or adjusted with a very high level of precision.

Description of the Prior Art

It is known that when certain fluorescent substances are subjected to radiation (such as X-irradiation, $\alpha$ rays, $\beta$ rays, $\gamma$ rays, ultraviolet rays or the like) part of the radiation energy is stored in the fluorescent substance, and that when this fluorescent substance is then exposed to a stimulating ray, for example of visible light, the fluorescent substance emits light in proportion to the stored energy. Such substances are termed storage fluorescent substances.

The present applicant has already proposed (i.e. in Japanese unexamined patent application Nos. 55 (1980)-12429 and No. 56 (1981)-11395, etc.) a radiation image data recording and read-out system utilizing this storage fluorescent substance, wherein radiation image information such as of a human body is first recorded on a sheet provided with the storage fluorescent substance, and the sheet is then scanned with a stimulating light, such as laser light, to produce light emittance which is read out photoelectrically to obtain image signals which are output as visible images on a recording medium such as photosensitive materials, a CRT, or the like.

As the stimulating light used to scan a sheet provided with the storage fluorescent substance and on which the radiation image information is recorded, attempts have been made to employ a composite of a plurality of laser beams and utilize this composite laser beam to carry out high-speed scanning.

In order to form such a composite of laser beams it is necessary to have the light paths of the laser beams coincide. When using a composite laser beam as the stimulating light for scanning purposes in the above type of radiation image data recording and read-out system, it is particularly necessary that the light paths coincide to an extremely high level of precision, which means it is necessary to be able to carry out very fine angular adjustments to the light paths, in the order of a few microradians, for instance.

However, with conventional light deflection devices used to adjust light paths, especially devices which perform such deflection by employing mechanical means to angle mirrors and other such deflection elements to the required degree, it has been virtually impossible to adjust the angle of the light path to the said fineness of several microradians.

SUMMARY OF THE INVENTION

The primary object of this invention is therefore to provide a light deflection device of very high utility which enables the angle of deflection to be set or adjusted with very high precision, is of simple construction and by means of which setting and adjustment of the angle of deflection are very easy to carry out.

In order to achieve the above objective, the light deflection device according to the present invention is characterized by comprising a light deflecting element such as a mirror disposed near the fixed end of a cantilever, and a deflecting means for imparting the required amount of deflection to the free end of the cantilever so as to finely angle the light deflecting element.

DESCRIPTION OF THE PREFERRED EMBODIMENTS

The present invention will now be described in further detail with reference to the accompanying drawings.

Figure 1:
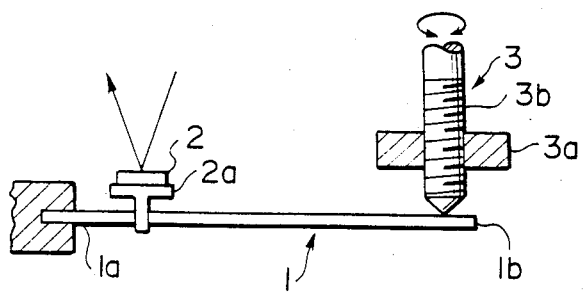
FIG. 1 shows a side view of an embodiment of the light deflection device according to the present invention.

With reference to FIG. 1, the device according to this invention comprises a cantilever 1, a light deflecting element 2 disposed near the fixed end 1a of the cantilever, and near the free end 1b a deflection means 3 for imparting the required amount of deflection.

The cantilever 1 is formed in the shape of a round bar or flat strip, one end 1a of which is fixed so as to be immovable and the other end 1b of which is free. A metal such as phosphor bronze or the like is a suitable material for the cantilever, but any material may be used which possesses the resilience required of a cantilever.

Figure 2:
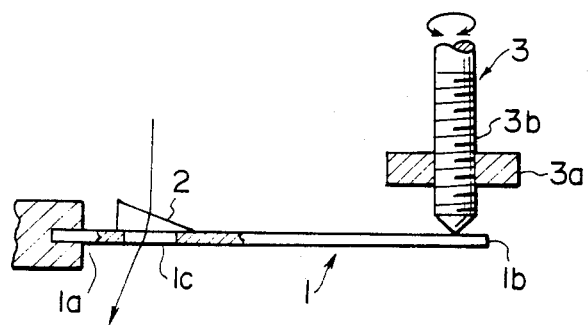
FIG. 2 shows a side view of another embodiment.

The light deflecting element 2 is affixed near the fixed end 1a of the cantilever via a support member 2a, and therefore inclines in accordance with the deflection of the cantilever 1 applied near the free end 1b of said cantilever. As the light deflecting element 2 can be used any element that provides a deflection of the light path as it inclines with the deflection of the cantilever. In the embodiment shown in FIG. 1 a half-mirror is employed, but a prism may also be used, as shown in FIG. 2. In FIG. 2, 1c is a hole formed in the cantilever 1 to allow the passage of light therethrough.

Regarding the deflection means 3, any means may be used that can impart the required amount of deflection near the free end of the cantilever, but it is preferable that the means enables the amount of deflection to be adjusted, and further, that it be capable of allowing adjustment of the amount of deflection to a very fine level for high precision. The means used in the present embodiment comprises a screw 3b threaded through a fixed member 3a and a pulse motor (not shown in FIG. 1) to rotate screw 3b clockwise or counterclockwise to thereby impart the required amount of deflection and enable the amount of deflection to be adjusted very finely and precisely.

Figure 3:
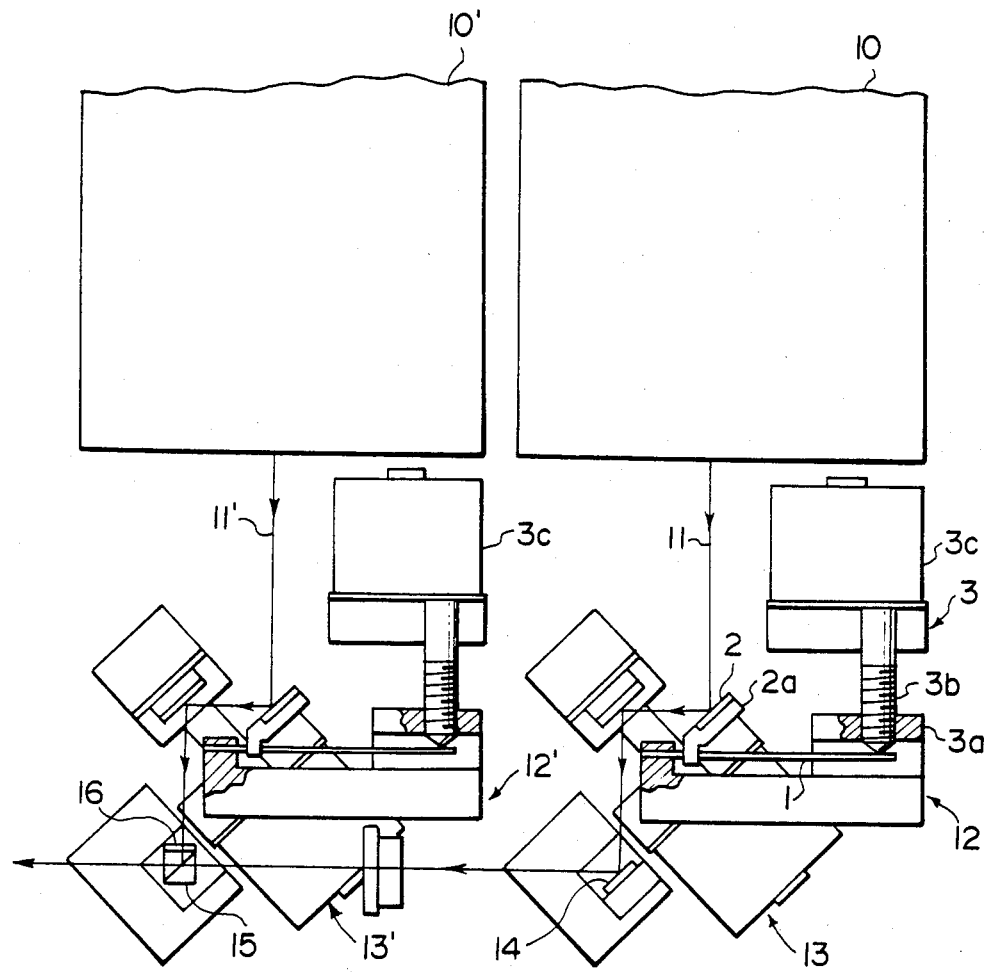
FIG. 3 shows a side view of an example of a light composite beam apparatus employing the light deflection device according to this invention.

The composite laser beam device shown in FIG. 3 employs a composite of two laser beams 11, 11' generated from first and second light sources 10, 10'. The laser beams 11, 11' pass through light deflection devices 12, 12', provided so as to deflect the beams in a plane parallel to the drawing sheet, and through light deflection devices 13, 13' provided so as to deflect the beams in a plane perpendicular to the drawing sheet, the first laser beam 11 being further passed through a half-mirror 14, and are then combined by a polarization beam splitter 15. In the drawing 16 is a half-wave plate.

Each of the light deflection devices 12, 12' and 13, 13' are of the same construction as the device shown in FIG. 1. In FIG. 3, 3c is the pulse motor for rotating the screw 3b clockwise or counterclockwise to thereby move the screw 3b vertically with reference to the fixed member 3a, imparting the required amount of deflection to the free end of the cantilever 1 and also enabling the amount of deflection to be controlled appropriately.

As has been described in the foregoing the light deflection device according to this invention comprising a light deflecting element provided near the fixed end of a cantilever, said light deflecting element being inclined by use of a deflection means to deflect the cantilever in the vicinity of its free end by a required amount, with the light being deflected by the inclination of the light deflecting element, makes it possible to set the angle of deflection extremely precisely, that is, to a very fine level of angular degree, and to adjust the amount of cantilever deflection to control the angle of deflection of the light to a very fine degree.

Figure 4:
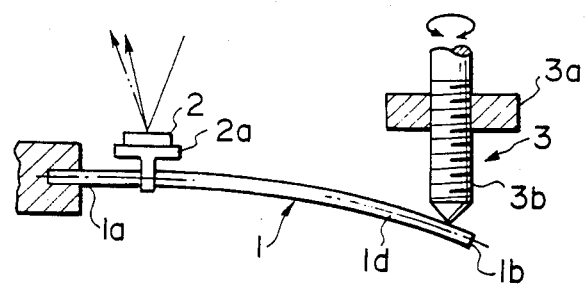
FIG. 4 is a side view of the embodiment of FIG. 1, showing the cantilever being deflected near the fixed end thereof.

That is, by deflecting the cantilever in the vicinity of its free end, as shown in FIG. 4, the axis 1d thereof forms a secondary curve with the fixed end 1a as the apex, and the deflection in the vicinity of the fixed end is extremely slight compared with that at the vicinity of the free end, in addition to which both deflections correspond. Therefore, by applying a specific amount of deflection in the vicinity of the free end it is possible to control the inclination of the light deflecting element disposed in the vicinity of the fixed end with great precision, enabling the angle of deflection of the light to be set and adjusted with extremely high precision. If for example a pulse motor is used to control the screw in the device formed as shown in FIG. 1 it is possible to control the deflection of light by very fine angular increments of 3–5 microradians per pulse of the pulse motor.

Furthermore, if this light deflection device is used to form the type of composite light apparatus shown in FIG. 3, it is possible to combine the light beams with very high precision.

In addition, mechanically the device is a very simple deflection means, comprising just a cantilever, light deflecting element and deflection means. Also, if the relationship between the inclination of the light deflecting element and the amount of deflection obtaining from the position of the light deflecting element, the position of deflection applied, the moment of inertia of area or modulus of longitudinal elasticity of the cantilever are obtained beforehand by computation or experiment, subsequent adjustment of the angle of deflection of the light can be done easily by adjusting the amount of cantilever deflection, making it extremely practical.

I claim:

1. A light deflection device for precisely deflecting a laser beam so that the laser beam can be precisely aligned coincident with at least one other laser beam, comprising a cantilever having a fixed end and a free end, a light deflecting element disposed in the vicinity of the fixed end of the cantilever and movable with high precision in response to movement of an intermediate portion of the cantilever between the fixed and free ends, and a deflection means for imparting a desired amount of deflection to the free end of the cantilever to cause a lesser deflection of the intermediate portion of the cantilever between the fixed end and free end, said deflection means comprising a screw and a motor, and said deflection means being capable of causing an angle of deflection of the light deflecting element to be precisely adjusted by the deflection imparted to the free end of the cantilever by the deflection means.

2. A light deflection device as claimed in claim 1 wherein the light deflection element is mounted on the cantilever adjacent the fixed end.

3. A light deflection device for precisely deflecting a laser beam so that the laser beam can be precisely alinged coincident with at least one other laser beam, comprising a cantilever having a fixed end and a free end, a light deflecting device disposed in the vicinity of the fixed end of the cantilever and movable with high precision in response to movement of an intermediate portion of the cantilever between the fixed and free ends, and a deflection means for imparting a desired amount of deflection to the free end of the cantilever to cause a lesser deflection of the intermediate portion of the cantilever between the fixed end and free end, said deflection means being capable of causing an angle of deflection of the light deflecting element to be precisely adjusted by the deflection imparted to the free end of the cantilever by the deflection means and said light deflecting device being a prism which deflects light through a hole in the cantilever.

4. An apparatus for making a composite of laser beams comprising a plurality of light sources for generating a plurality of laser beams, a first plurality of light deflection devices for deflecting the respective laser beams in a first plane, a second plurality of light deflection devices for deflecting the respective laser beams deflected by the first plurality of deflection device in a second plane, and a means for combining thus deflected laser beams to obtain a composite of said a plurality of laser beams, at least one of said light deflection devices comprising a cantilever, a light deflecting element disposed in the vicinity of the fixed end of the cantilever, and a deflection means for imparting a desired amount of deflection to the free end of the cantilever, wherein the light deflecting element is inclined by deflection imparted to the free end of the cantilever by the deflection means.

5. An apparatus as defined in claim 2 wherein said combining means is a polarization beam splitter.

* * * * *